March 10, 1936.  H. C. EDDY  2,033,420

METHOD AND APPARATUS FOR ELECTRICALLY TREATING EMULSIONS

Filed Nov. 17, 1934  2 Sheets-Sheet 1

INVENTOR:
HAROLD C. EDDY,
By
Floyd H. Harris
ATTORNEY.

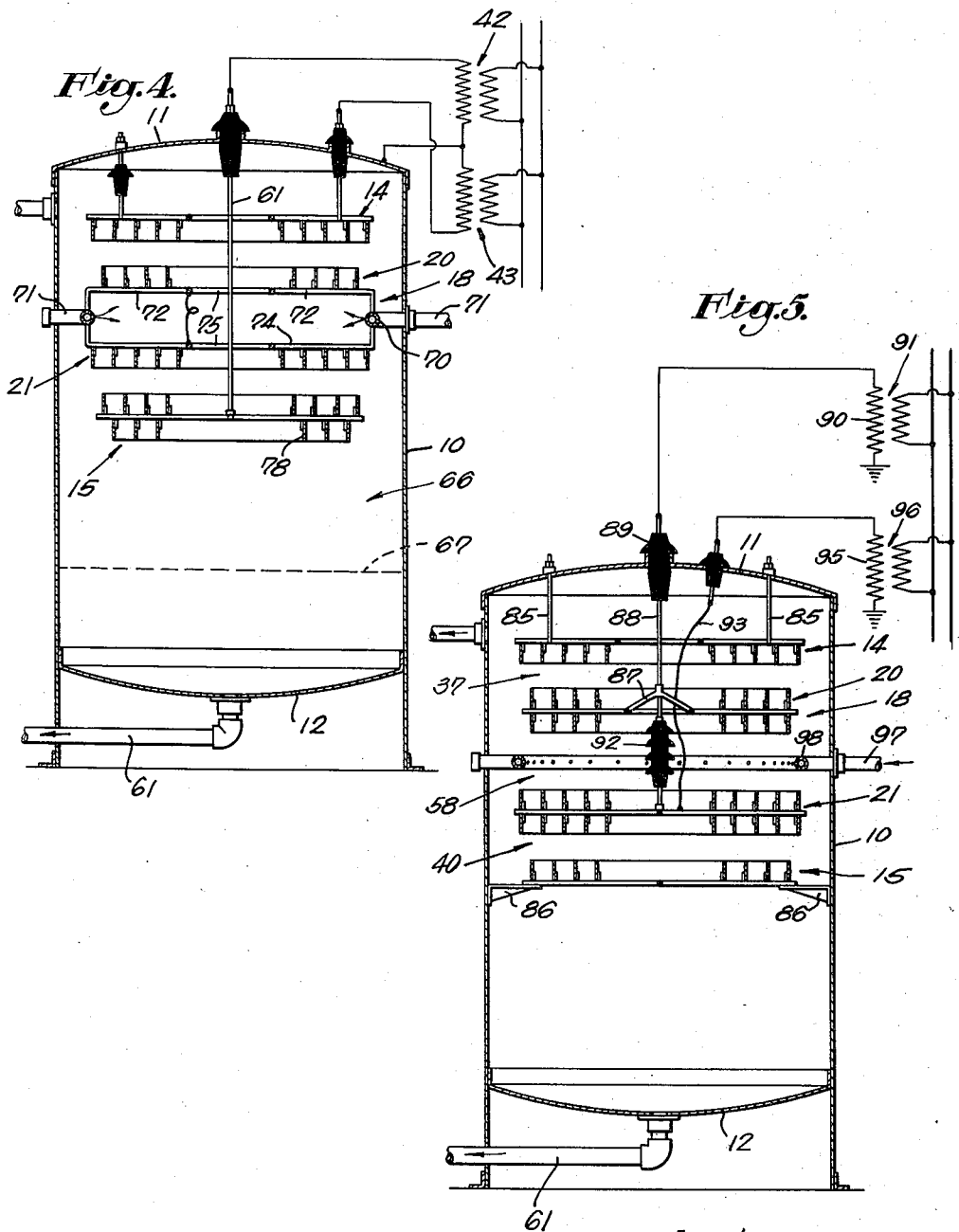

Patented Mar. 10, 1936

2,033,420

UNITED STATES PATENT OFFICE 2,033,420

METHOD AND APPARATUS FOR ELECTRICALLY TREATING EMULSIONS

Harold C. Eddy, Los Angeles, Calif., assignor to Petroleum Rectifying Company of California, Los Angeles, Calif., a corporation of California Application November 17, 1934, Serial No. 753,493

10 Claims. (Cl. 204—24)

My invention relates to an electric treater of novel form which finds particular utility in the treatment of emulsions to separate the phases thereof by electric means.

In my copending application Serial 655,556, "Method of and apparatus for treating petroleum", I have disclosed a novel treater which has been eminently successful on certain of the heavier oils. Previous attempts to use such a treater in the dehydration of light oils have not been successful if such oils have a particular tendency to form a sludge. While this type of treater will satisfactorily handle a certain amount of sludge by drawing this sludge gradually into the field for treatment, excessive amounts of sludge cannot be thus handled. Thus, if the sludge builds up faster than it can be brought into the field, short-circuiting of the electrodes will result. Before the treater can be again put into operation it must be drained and refilled at least in part with dry oil.

It is an object of the present invention to provide a treater capable of treating light oils having a marked sludging tendency.

My experiments show that one controlling factor in solving this problem is the placement of the emulsion inlet which discharges the emulsion into the tank preparatory to treatment. In my copending application, supra, the emulsion was introduced upwardly into the lowermost field. I have found that the lighter oils may be very satisfactorily treated if the emulsion is introduced into a more central portion of the space between the uppermost and lowermost electrodes; e. g., at an elevation higher than that disclosed in my copending application.

It is an object of the present invention to introduce the incoming emulsion at a section between the uppermost and lowermost electrodes.

It is a further object of the present invention to introduce the emulsion in such a manner that the sludge is electrically treated before it reaches the bottom of the tank.

A further object of the invention lies in the provision of a system in which the dry oil separated in one or more of the fields may rise and be mixed with the incoming emulsion or with the emulsion being treated in one of the upper fields.

A further object of the present invention lies in the provision of a novel four-electrode structure in which the emulsion is introduced between the second and third electrodes.

I have further found it desirable in some instances to introduce the incoming emulsion into a substantially equipotential space between such second and third electrodes, and it is an object of the present invention to provide such a system.

Other novel features included among the objects of the present invention include a novel arrangement and construction of a plurality of electrode structures particularly adapted to set up edge-to-edge fields which are very effective in treating emulsion.

Still further objects and advantages of the invention will be made evident hereinafter to those skilled in the art.

Referring to the drawings —

Figs. 4 and 5 illustrate still other embodiments of the invention.

Figure 1:
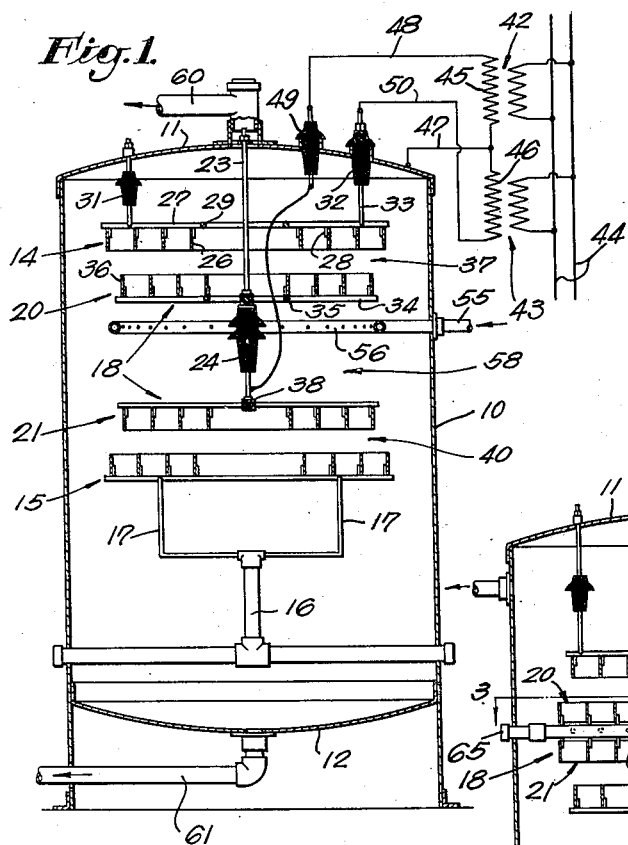
Fig. 1 is a vertical sectional view of one embodiment of the invention.

In the form of the invention shown in Fig. 1 four electrodes are disposed in the usual tank 10 including top and bottom walls 11 and 12. The uppermost electrode means is in the form of an upper electrode structure 14 and comprises a first electrode of the system. The lowermost electrode means comprises a lower electrode structure 15 supported by any suitable means such as a pipe 16 and arms 17, this lower electrode structure in effect forming a fourth electrode in the embodiment shown.

Disposed between the upper and lower electrode structures 14 and 15 is an intermediate electrode structure indicated in general by the numeral 18. In the embodiment shown this intermediate electrode structure may include two electrodes 20 and 21 which in effect comprise a second and third electrode respectively.

A support means in the form of a rod 23 extends downward in the tank 10 to support the second electrode 20. An insulator 24 is in turn supported by the rod 23 and is secured in supporting relationship with the third electrode 21, thus acting to insulate the second electrode from the third electrode in this form of the invention.

The construction of these electrodes will be apparent from a consideration of Fig. 1. All are preferably of an interstitial character, though in some instances only certain of these electrodes need be thus formed. In the preferred form, each of the electrode structures includes a plurality of vertically disposed metallic members 26 mounted on supporting arms 27, usually in concentric relationship. These members being thus at the same potential, the spaces therebetween are of equipotential character. Pins 28, or any other suitable means, may be used for connecting the metallic members 26 to the supporting arms 27. The upper electrode structure 14 is shown as including a ring 29 to which the supporting arms 27 are secured, the rod 23 extending through the ring 29. The metallic members 26 are usually in the form of rings or hoops which, on the upper electrode structure 14, extend downward to form annular edges adjacent which fields may concentrate. These rings or hoops are relatively thin and thus occupy only a very small proportion of the total cross-sectional area of the tank measured in a horizontal direction. So also, the suppprting arms 27 and the ring 29 are relatively small. The result is that an electrode structure so designed will not materially impede the vertical movement of the emulsion constituents in the tank 10, a very desirable factor. If it is desired that the upper electrode structure 14 comprise one of the live electrodes of the system, as in Fig. 1, this electrode structure can be suitably supported on one or more insulators 31 and supplied with current through conductor means extending through a bushing 32. As shown, this conductor means, indicated by the numeral 33, may also act as a support for the upper electrode structure 14. In this event an auxiliary field will be formed between this upper electrode structure and the top wall 11.

The second electrode 20 may be constructed similarly to the upper electrode structure 14, including supporting arms 34 extending outward from a ring 35 and suitably retaining a plurality of metallic members in the form of rings or hoops 36. These rings provide upward extending edges which are preferably staggered with respect to the downward extending edges of the upper electrode structure 14, as shown in Fig. 1. If the edges of these two electrodes are spaced vertically from each other, and disposed in staggered relationship as shown, any electrode field established in an upper treating space 37 between these electrodes, will, in effect, comprise an edge-to-edge field, the most intense portion of this field being inclined with respect to the horizontal as explained in my application supra.

The third electrode 21 may be similarly formed except that the supporting arms may extend inward to meet at a junction 38, thus eliminating the ring 29, for instance, disclosed in conjunction with the upper electrode 14. The lower electrode structure 15 can be similarly formed. Preferably, the third electrode 21 includes downward extending edges which are staggered with respect to the upward extending edges of the lower electrode structure 15. A lower treating space 40 is thus formed between the third electrode 21 and the lower electrode structure 15, and any field in this space will be most intense along the lines joining the edges of these two electrodes, and thus being inclined with respect to the horizontal. While most satisfactory results accrue from the use of such fields in an inclined position, this is not necessary to the utility of the invention. The most intense portions of the field in either the upper or lower treating space may, if desired, be vertically disposed without departing from the spirit of the invention.

Various means may be utilized for energizing the electrodes. While it is possible in some instances to use a single transformer in this regard, the form of the invention shown in Fig. 1 includes two transformers 42 and 43, the primary windings thereof being connected through a suitable switching or control means, not shown, to a line 44. These transformers provide secondary windings 45 and 46 which are connected together and to the tank 10 by a conductor 47. The remaining terminal of the winding 45 is connected by a conductor 48 which extends through a bushing 49 to the third electrode 21. The remaining terminal of the winding 46 is connected by a conductor 50 to the conductor means 33, thus energizing the upper electrode structure 14. Thus, the first and third electrodes 14 and 20 are live electrodes, while the second and fourth electrodes 20 and 15 are grounded to the tank 10 through their respective supports.

The incoming emulsion is introduced under pressure into a pipe 55 which communicates with a ring pipe 56 which is positioned between the upper and lower electrode structures 14 and 15, and which preferably extends into the tank at a level between the second and third electrodes 20 and 21, thus extending adjacent the intermediate electrode structure 18. This ring pipe 56 may be perforated to discharge the emulsion constituents either upwardly or downwardly, or it may be perforated as shown to direct the emulsion constituents inward toward the center of the tank. In this form of the invention it will be noted that the incoming emulsion is introduced into an auxiliary treating space 58 in which an electric field is established due to the potential difference existing between the second and third electrodes 20 and 21. However, as will be hereinafter pointed out, this is not always essential to the invention.

In the operation of this form of the invention, the treater 10 is preferably filled with dry oil prior to the time that the electrodes are energized. After establishing the fields as hereinbefore described, the emulsion is forced into the interior of the tank 10 and is discharged into the auxiliary field 58. Treatment immediately commences, and certain of the emulsion constituents rise through the second electrode 20 and enter the upper treating space 37 where they are subjected to further treatment. The lighter phase, usually oil, then rises through the upper electrode structure 14 and accumulates in the upper end of the tank 10 whence it may be continuously or intermittently withdrawn through a pipe 60 in the usual manner. Those emulsion constituents which drop downward in the auxiliary treating space 58 move through the third electrode 21 and into the lower treating space 40. The action of each of these fields tends to coalesce the dispersed phase, usually water, into masses of sufficient size to gravitate downward in the tank 10. In the lower treating space 40, the final coalescing step is performed, and the water masses drop downward through the lower electrode structure 15 and into the bottom of the tank 10 whence they can be continuously or intermittently withdrawn through a pipe 61 in the usual manner.

With certain of the lighter oils, the position of the emulsion inlet is particularly important, as pointed out above. Introducing into such a central position as shown insures immediate treatment of the emulsion and its associated sludge, and prevents an accumulation of sludge in the field, thus rectifying the difficulty sometimes encountered when introducing the emulsion in a manner shown in my application supra. With the system herein disclosed the sludge is treated before it reaches the bottom of the treater, and, furthermore, the dry oil which separates in the lower treating space 40 is mixed with the incoming emulsion or with the emulsion being treated in the upper treating space 37. Very desirable results accrue from thus mixing a portion of the treated oil with the incoming emulsion or with the emulsion constituents undergoing treatment in this upper field.

Figure 2:
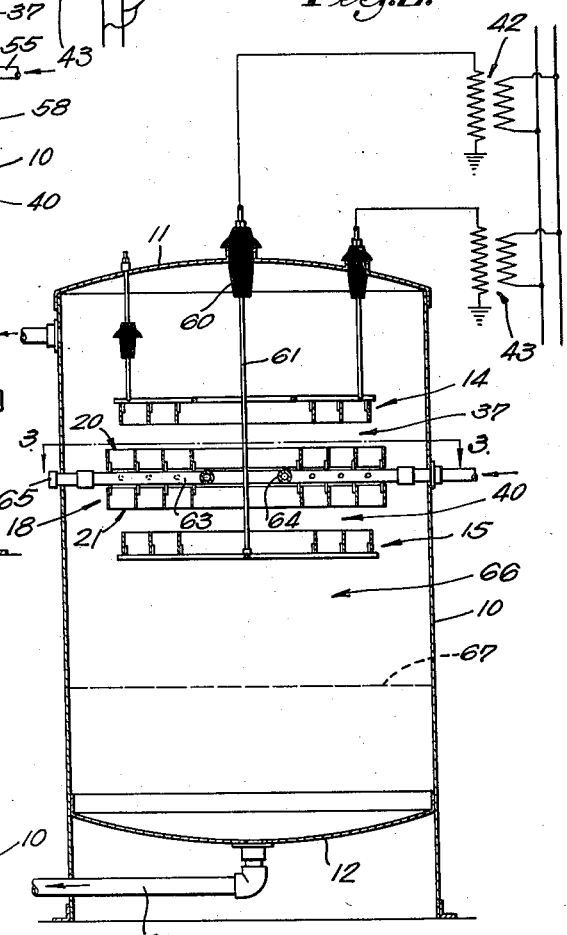
Fig. 2 is a vertical sectional view of an alternative form of the invention.
Figure 3:
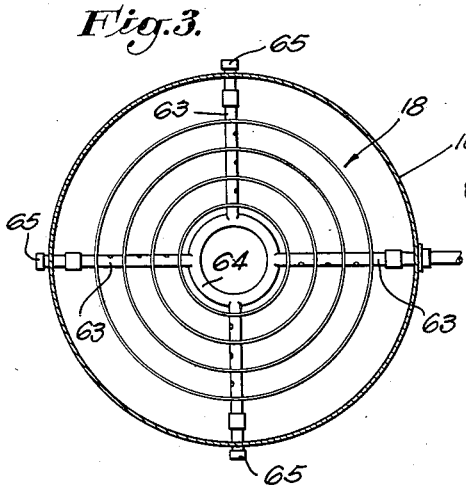
Fig. 3 is a sectional view taken on the line 3—3 of Fig. 2.

In the form of the invention shown in Fig. 2 the auxiliary field 58 is dispensed with. Upper and lower electrode structures 14 and 15 are used, these being of a form similar to the form shown in Fig. 1. It will be noted, however, that the lower electrode structure 15 is in this instance maintained at a potential above ground, this electrode structure being supported from a bushing 60 by a rod 61. Two separate transformers are shown for energizing the upper and lower electrode structures 14 and 15, one terminal of each of the secondary windings thereof being connected to these electrodes, the remaining terminal being grounded as indicated. If desired, the transformers may produce substantially identical voltages. In many instances, however, it is desirable to impress across the upper treating space 37 a potential which is greater than that impressed across the lower treating space 40. This may be accomplished by suitable selection or regulation of the transformers utilized.

So also, in Fig. 2 I have shown a different form of intermediate electrode structure 18. Here the second and third electrodes 20 and 21 have a common support and are thus electrically connected together and maintained at ground potential. In accomplishing this result a series of outward extending pipes 63 are used which are in communication with a ring pipe 64. These pipes support the upward extending rings or hoops of the second electrode 20, and the downward extending rings or hoops of the third electrode 21. In this form of the invention I find it very convenient to introduce the emulsion into one of the outward extending pipes 63, closing the remaining pipes 63 by suitable caps 65. The pipes 63 can be perforated to discharge the emulsion in any desired direction, either upward, downward, or sidewise. In the embodiment shown these perforations are so formed as to direct the emulsion tangentially into the equipotential space between the second electrode 20 and the third electrode 21. The effect of this tangential introduction is usually to slowly rotate the entire liquid constituents of the tank, so that the rising emulsion constituents will spiral upward in the tank rather than moving vertically therein as is the case in the form shown in Fig. 1.

So also, with reference to Fig. 2 it will be clear that an auxiliary field is established in a treating space 66 below the lower electrode structure 15 and above the surface 67 of the body of water which has accumulated in the lower end of the tank 10.

In Fig. 4 I have illustrated another embodiment of the invention in which the emulsion is introduced into an equipotential space between the upper and lower electrode structures 14 and 15. In this form of the invention the emulsion is fed to an annular spray pipe 70 through one of a series of outward extending pipes 71 which retain the spray pipe 70 in position. A series of supporting arms 72 extends upward and inward from the spray pipe 70 and supports the upward-extending rings or hoops of the second electrode 20. Similarly, supporting arms 74 extend downward and inward from the spray pipe 70 to support the downward-extending rings or hoops of the third electrode 21. Rings 75 are preferably positioned at the inner end of each of the supporting arms 72 and 74 to equally distribute the electric stress around the rod 61 which supports the lower electrode structure 15. The intermediate electrode structure 18 is, of course, grounded to the tank 10 through the pipe 71. This electrode system also provides an equipotential space between the second and third electrodes 20 and 21 into which space the incoming emulsion may be discharged. In this form of the invention the perforations of the spray pipe preferably extend inward so as to direct the emulsion in the direction indicated by the arrows. In other instances, however, the perforations may be inclined or vertically disposed.

In this form of the invention the field in the auxiliary treating space 66 is made more intense by positioning downwardly extending rings or hoops 78 on the bottom of the lower electrode structure 15. The emulsion constituents moving downward through this lower electrode structure 15 are thus subjected to a final electric treatment in the auxiliary treating space 66. The concentrated nature of the field adjacent the depending edges of the rings or hoops often assist in the separation of the water from the oil.

In the form of the invention shown in Fig. 5 a slightly different electrode arrangement is used. The upper electrode structure 14 is similar to that previously described with reference to Fig. 1 except that it is grounded to the tank through supports 85. Similarly, the lower electrode structure 15 is grounded to the tank by any suitable support such as brackets 86 shown. In this form of the invention the intermediate electrode structure 18 includes second and third electrodes 20 and 21 which are maintained at potentials above ground. Each preferably provides both upward and downward extending rings or hoops as shown. The second electrode 20 is supported on a spider 87 suspended from a conductor 88 which is in turn supported by a bushing 89 and connected to a secondary winding 90 of a transformer 91. The other terminal of this secondary winding is grounded as shown, being thus connected to the tank 10.

The third electrode 21 is suspended on a string of insulators 92 from the spider 87. A conductor 93 energizes the third electrode 21 and extends upward between the arms of the spider 87, being connected to one terminal of a secondary winding 95 of a transformer 96. The remaining terminal of this winding is grounded as shown. Intense electric fields are thus set up in the upper and lower treating spaces 37 and 40.

The incoming emulsion may be introduced through one or more pipes 97 communicating with a ring pipe 98 suitably perforated to distribute the incoming emulsion. Preferably the perforations are formed to direct the emulsion inwardly, though these perforations may be angularly disposed with respect to the horizontal, or vertically disposed, if desired.

If the transformers 91 and 96 are identical, and the currents through the secondary windings thereof are substantially the same, the second and third electrodes 20 and 21 will be at substantially the same potential. No electric field will thus be set up therebetween, except as such fields may incidentally be formed between either of these electrodes and the spray pipe 98. Thus, in effect, the emulsion is still introduced into an equipotential space in this form of the invention if the transformers 91 and 96 are identical. This will not be true if these transformers are not identical.

In all of the foregoing examples, I have illustrated the use of two transformers energizing the electrodes. It should be clear, however, that this is not invariably necessary. In some instances a single transformer can be used, being connected to both of the live electrodes, assuming that two live electrodes are used. Even when two transformers are used, however, these transformers can be used in various ways. If connected in parallel, as shown in Fig. 2, the voltages across the upper and lower fields will be substantially identical, assuming that the transformers are of similar rating.

In other instances these transformers can be connected additively so that the potential difference between the two live electrodes will be substantially twice as great as the potential difference between either live electrode and its corresponding grounded electrode. Various other modifications are possible.

Several forms of the invention have been herein disclosed for purpose of illustration. It should not be understood, however, that the invention is limited to the embodiments shown. Various changes and modifications may be made without departing from the spirit of the present invention, and will be apparent to those skilled in the art.

I claim as my invention:

1. In combination in an electric treater for emulsion containing a dispersed phase and a continuous phase and including a tank in which said phases can gravitationally separate after electric treatment: an upper, an intermediate, and a lower electrode structure in said tank and positioned one above the other to define treating spaces therebetween, each of said electrode structures being disposed transverse to the vertical movement of said phases when gravitationally separating and each of said electrode structures comprising a plurality of concentric metallic members spaced from each other to define equipotential spaces and providing annular edges spaced longitudinally from corresponding annular edges of the adjacent electrode structure, said metallic members being small so that substantially the whole surface of each electrode structure exposed to the vertically moving phases during separation consists of said equipotential spaces whereby said electrode structure presents a minimum of impedance to the gravitationally seperating phases as they move in said tank; means for establishing electric fields in said treating spaces, said fields concentrating at said annular edges of said metallic members of the two electrode structures bounding either of said treating spaces whereby the most intense portions of said fields lie along lines joining the annular edges of the metallic members of the electrode structures; means for introducing emulsion into said tank at an elevation between said upper and said lower electrode structures and adjacent said intermediate electrode structure whereby the rising emulsion constituents are subjected to the action of the upper field while the dropping emulsion constituents are subjected to the action of the lower field; means for withdrawing one of said phases from one end of said tank; and means for withdrawing the other of said phases from the other end of said tank.

2. In an electric treater for emulsions, the combination of: a tank; an upper live electrode structure disposed to extend substantially horizontally in said tank; a lower live electrode structure disposed to extend substantially horizontally in said tank; an intermediate electrode structure in said tank at an elevation intermediate the upper and lower live electrode structures each of said electrode structures comprising a plurality of vertically-extending portions with equipotential spaces therebetween whereby the fields between adjacent electrode structures will be concentrated at the edges of said vertically-extending portions; grounded emulsion-introduction means for introducing the emulsion to be treated at an elevation between said upper and lower live electrode structures and which elevation is adjacent said intermediate electrode; and means for establishing electric fields between said electrode structures.

3. In an electric treater for emulsions, the combination of: an upper electrode structure; a lower electrode structure, each of said electrode structures including a plurality of metallic members concentrically disposed, said metallic members on said upper electrode structure providing downwardly extending edges and said metallic members on said lower electrode structure providing upwardly extending edges disposed at a level below the level of said downwardly extending edges of said upper electrode structure; means for establishing an electric field in the space between said edges of said electrode structures; a perforated pipe of ring form positioned to direct the emulsion to be treated between said upper and lower electrode structures at a section between said downwardly extending edges and said upwardly extending edges of said electrode structures.

4. In an electric treater for emulsions: a tank; two interstitial electrodes extending in said tank in spaced relationship relative to each other; means electrically connecting said two electrodes to maintain the space therebetween of equipotential character; means for introducing the emulsion to be treated into said equipotential space in a direction toward the axis of said tank, a portion of said emulsion rising through the interstices of the upper of said electrodes and a portion dropping through the interstices of the lower of said electrodes; and means for establishing electric fields above the uppermost interstitial electrode and below the lowermost interstitial electrode to respectively receive said rising and dropping portions of said emulsion to electrically treat same.

5. In an electric treater for emulsions, the combination of: a tank containing emulsion constituents; two interstitial electrodes in said tank spaced one above the other, the uppermost of said electrodes providing upward-extending portions and the lowermost of said electrodes providing downward-extending portions; means electrically connecting said two interstitial electrodes; emulsion-introduction means discharging emulsion into the space between said interstitial electrodes; and means for establishing an electric field adjacent the edges of said upward-extending portions of said uppermost electrode and adjacent the edges of said downward-extending portions of said lowermost electrode whereby emulsion constituents move from said space between said electrodes through the interstices of said electrodes and into said fields.

6. A combination as defined in claim 1 in which said means for introducing said emulsion includes orifice means discharging into said equipotential spaces defined between said concentric metallic members of said intermediate electrode structure.

7. In an electric treater for emulsions, the combination of: a tank; an upper electrode structure extending substantially horizontally and almost completely across said tank; a lower electrode structure extending substantially horizontally and almost completely across said tank at an elevation below said upper electrode structure; an intermediate electrode structure of interstitial character and providing an equipotential space, said intermediate electrode structure being positioned between said upper and lower electrode structures; means for establishing an upper electric field between said upper electrode structure and the upper portion of said intermediate electrode structure and a lower electric field between said lower electrode structure and the lower portion of said intermediate electrode structure; and means for introducing the emulsion to be treated directly into said equipotential space of said intermediate electrode structure whereby the lighter portion of said emulsion moves upward from said equipotential space through the interstices of said intermediate electrode structure into said upper field, and the heavier portion of said emulsion drops from said equipotential space through the interstices of said intermediate electrode structure to said lower field, the interstitial character of said intermediate electrode structure permitting open communication between said upper and lower fields for any treated emulsion constituents acting to move by gravity from one elevation in said tank to another.

8. In an electric treater for emulsions, the combination of: an uppermost first electrode means; a second electrode means of interstitial character below said first electrode means; a third electrode means of interstitial character below said second electrode means; a fourth electrode means below said third electrode means; means for establishing an electric field between said first and second electrode means, and between said third and fourth electrode means, by impressing a potential upon said second and said third electrode means; and means for introducing the emulsion to be treated between said second and said third interstitial electrode means and thus into a space bounded above and below by interstitial electrode means whereby the rising emulsion constituents can move through the interstices of said second electrode means into the field between said first and said second electrode means, and the dropping emulsion constituents can move through the interstices of said third electrode means and into the field between said third and said fourth electrode means.

9. In an electric treater for emulsion, the combination of: an uppermost first electrode; a second electrode of interstitial character below said first electrode; a third electrode of interstitial character below said second electrode; means for electrically connecting said second and third electrodes to maintain same at the same potential to provide an equipotential space therebetween; a fourth electrode below said third electrode; means for establishing an electric field between said first and second electrodes, and between said third and fourth electrodes; and means for introducing the emulsion to be treated into said equipotential space between said second and said third interstitial electrodes and thus into a space bounded above and below by interstitial electrodes whereby the rising emulsion constituents can move through the interstices of said second electrode into the field between said first and said second electrodes, and the dropping emulsion constituents can move through the interstices of said third electrode and into the field between said third and said fourth electrodes.

10. In an electric treater for emulsion, the combination of: an uppermost first electrode; a second electrode of interstitial character below said first electrode; a third electrode of interstitial character below said second electrode; means for insulating said second and said third electrodes from each other; a fourth electrode below said third electrode; means for establishing an electric field between said first and second electrodes, and between said third and fourth electrodes, said means including means connected to said second and third electrodes to maintain a potential difference therebetween; and means for introducing the emulsion to be treated between said second and said third interstitial electrodes and thus into a space bounded above and below by interstitial electrodes whereby the rising emulsion constituents can move through the interstices of said second electrode into the field between said first and second electrodes, and the dropping emulsion constituents can move through the interstices of said third electrode and into the field between said third and fourth electrodes.

HAROLD C. EDDY.